United States Statutory Invention Registration [19]

[11] Reg. Number: H773

Keedwell et al. [43] Published: May 1, 1990

[54] COALESCER FILTER UNIT DRAIN DEVICE

[75] Inventors: Cyril A. Keedwell, Victoria, Canada; Steven L. Mills, Old Portsmouth, England

[73] Assignee: Pall Corporation, Glen Cove, N.Y.

[21] Appl. No.: 251,385

[22] Filed: Sep. 30, 1988

[30] Foreign Application Priority Data

Oct. 1, 1987 [GB] United Kingdom ..... 8723063

[51] Int. Cl.[5] ..... B01D 46/10

[52] U.S. Cl. ..... 55/498; 210/349; 210/438; 210/444; 210/484

[58] Field of Search ..... 210/168, 171, 194, 299, 210/303, 308, 309, 310, 311, 312, 349, 416.1, 416.5, 436, 437, 438, 439, 440, 443, 444, 445, 453, 454, 483, 484, 493.1, 493.2, 497.01, 501.2, DIG. 5; 55/46, 218, 259, 280, 316, 340, 350, 355, 385 C, 387, 394, 395, 421, 466, DIG. 17, DIG. 25

[56] References Cited

U.S. PATENT DOCUMENTS

| | | | |
|---|---|---|---|
| 1,580,380 | 4/1926 | Macdonald | 55/DIG. 17 |
| 3,165,470 | 1/1965 | Giesse et al. | 55/DIG. 25 |
| 3,252,270 | 5/1966 | Pall et al. | 55/DIG. 17 |
| 3,273,313 | 9/1966 | Livesey et al. | 55/46 |
| 3,384,242 | 5/1968 | Kudlaty et al. | 210/436 |
| 4,295,966 | 10/1981 | LeBlanc et al. | 210/436 |
| 4,519,819 | 5/1985 | Frantz | 210/DIG. 5 |
| 4,780,203 | 10/1988 | Barcy | 55/DIG. 25 |

*Primary Examiner*—John F. Terapane
*Assistant Examiner*—Joseph D. Anthony
*Attorney, Agent, or Firm*—Leydig, Voit & Mayer

[57] ABSTRACT

A spin-on type coalescer filter unit comprises a siphon tube which extends from inside the bottom of the filter element canister along the center line of the element, through the attachment nipple of the filter unit head, and into a fitting designed to receive the tube end. The fitting connects the tube to an oil drain passage so that coalesced oil may be driven through the siphon tube and to a drain line by high pressure in the filter canister.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COALESCER FILTER UNIT DRAIN DEVICE

TECHNICAL FIELD

The present invention relates to coalescer filter units and in particular to spin-on type coalescer filter units such as those typically found at points downstream of compressor devices in refrigeration systems, pneumatic power units, and mobile air compressors to remove liquid contaminants from gases flowing in the system.

BACKGROUND OF THE INVENTION

In systems utilizing compressed gases, for example, refrigeration systems and pneumatic power systems, coalescer filter units are frequently used to remove oil from the working gas being circulated through the system. This oil becomes mixed with the high pressure gas during compression by positive displacement compressors such as, for example, rotary screw compressors, in which oil is used to effect a gas seal between moving compressor parts and is picked up by the gases as an aerosol during the compression process. In some cases, most of the mass flow leaving the compression stage may consist of this oil aerosol and, although the bulk of this material will precipitate out of the flow as it progresses downstream, a residual must be filtered from the high pressure flow before it continues downstream to be introduced, for example, into the evaporator unit of a refrigeration system or pneumatic activators of a pneumatic power system.

Typically, this oil is removed by a spin-on type coalescer filter unit located a short distance downstream of the compressor unit. These spin-on type filter units characteristically include a filter head and a cylindrical filter element suspended beneath the head with its axis generally vertical. The head includes a high pressure inlet chamber, a lower pressure outlet chamber, and a filter element mounting surface with a threaded attachment nipple. The filter element includes a cylindrical canister which has a closed bottom end and an attachment plate at a head end with a threaded orifice to engage the threads of the nipple and hold the head end of the canister snugly against the filter element mounting surface. Typically, a cylindrical filter cartridge is mounted concentrically within the cylindrical canister and, when the filter element is attached to the filter head, high pressure gas may flow from the high pressure chamber of the head through a passage provided in the attachment nipple and into a hollow center of the filter cartridge. The gas then flows through a porous wall of the filter cartridge into an annular space formed between the filter cartridge and the filter canister, where it can then flow through openings provided in the filter element base and the filter element mounting surface into the lower pressure outlet chamber of the head and on through the system. As the compressed gas flows from the core of the filter cartridge radially outward through the cartridge wall to the annular space, oil contaminants coalesce in the porous material of the filter cartridge wall. The coalesced oil drops and migrates to the exterior filter cartridge surface, due to the influence of the pressure gradient over the filter cartridge wall. Once on the cartridge surface, the coalesced drops of oil flow, under the influence of gravitational force, to the bottom of the filter element canister. A fitting is provided at the bottom of the canister to attach an oil drain line to remove the coalesced oil.

By arranging the axis of the cylindrical filter unit vertically, locating both the gas inlet and outlet at the upper, head end of the filter element, and drawing the coalesced oil from the closed bottom end of the canister, the coalesced oil is accumulated in an area of relatively low gas flow velocity. This minimizes the gas content of the gas flowing through the outlet. While this arrangement of the prior art coalescer filters is functionally effective, it necessitates the removal of an oil drain line from the bottom end of the filter element canister whenever the filter element is to be changed or serviced. Limitations are also imposed on equipment design by the need to provide working room for tools used to attach and free the drain line and for the drain line itself.

DISCLOSURE OF THE INVENTION

It is an object of the present invention to allow coalesced oil to be collected at the bottom end of a spin-on type coalescer filter unit canister, where air velocity is low, while avoiding the necessity of having an oil drain line and attachment fitting at the bottom end of the canister which must be removed when changing the filter element or servicing the filter unit. The present invention eliminates the necessity of performing drainage line removal and replacement steps each time the element is to be changed or the unit serviced. By minimizing the frequency with which tools are applied to the line and attachment fitting and the handling of the line itself, the opportunities for damage and equipment wear are also reduced.

Accordingly, the invention provides a mechanism for draining a spin-on type coalescer filter unit which does not require a drain line to be attached at the bottom end of the canister of the filter element. The invention comprises a siphon tube which extends from inside the bottom end of the canister, through an end cap of the coalescer filter cartridge, along the center line of the filter element, and out of the spin-on filter element. The siphon tube is supported near the head end of the element by a locating bracket at the head end of the cartridge. When the unit is assembled, the siphon tube passes through the attachment nipple of the head and into a fitting designed to receive its head end. This fitting connects the tube with an oil drain passage so that coalesced oil may be driven, by high pressure in the filter canister, through the siphon tube and receiver fitting and returned by the passage and an oil drainage line to a low pressure point in the system such as, for example, the oil reservoir or compressor inlet. The rate of air and oil flow through the siphon tube of the present invention is controlled by an orifice provided in the oil drain passage of the receiver fitting. Gas flow from the siphon tube, and the depth of oil accumulation in the bottom end of the canister, may be controlled by adjusting the fit and length of engagement of the siphon tube in the receiver fitting.

During assembly of the filter unit, the siphon tube is introduced into the receiver fitting prior to engagement of the attachment nipple threads by the threads of the orifice in the filter element attachment plate, thus ensuring proper connection of the siphon tube. The provision of the siphon tube eliminates the need for a drain line fitting at the base of the canister and removal of a drain line to service the coalescer filter element yet allows coalesced oil to be collected at the bottom end of the cartridge and canister away from the gas inlet and outlet, where air velocity is low. This eliminates removal and replacement steps required in servicing prior art filters which saves time and equipment wear, particularly where work space at the bottom of the filter canister is confined due to equipment geometry.

Other objects, advantages, and aspects of the invention will become apparent upon reading the following detailed description and appended claims and upon reference to the accompanying drawings.

BEST MODE FOR CARRYING OUT THE INVENTION

Figure 1:
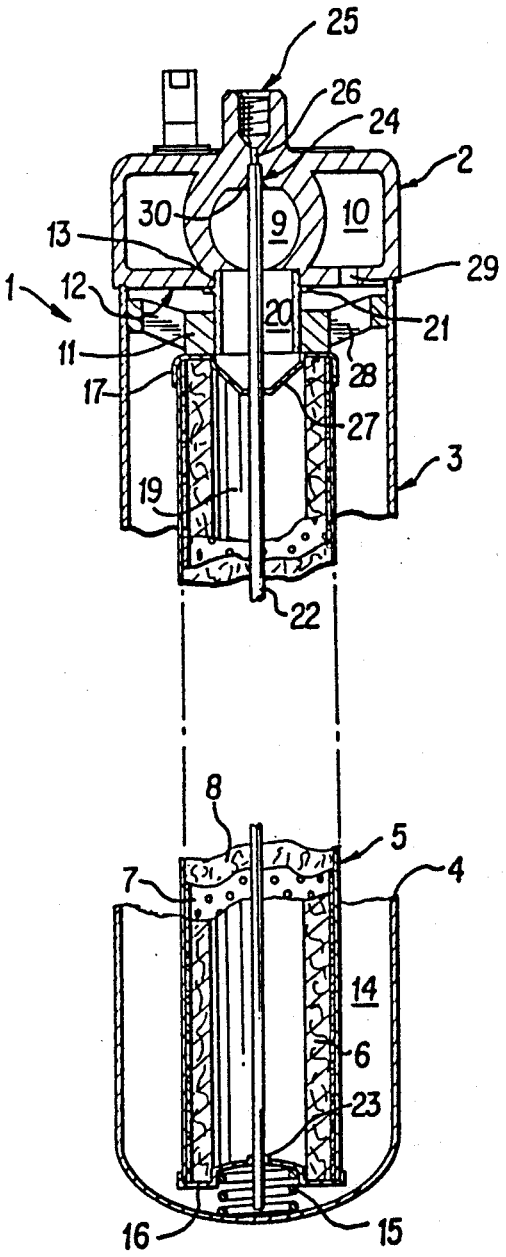
FIG. 1 is a sectional view of an exemplary spin-on type coalescing filter unit embodying the present invention.

As shown in FIG. 1, an exemplary coalescer filter unit 1 embodying the present invention generally comprises a filter element 3 mounted on a filter element mounting surface 12 of a filter head 2 by a threaded attachment nipple 13. A filter cartridge 5 is mounted concentrically within a canister 4 to form an annular space 14 between the canister and filter cartridge. The head end of cartridge 5 is maintained in contact with attachment plate 11 by a spring 15 which is compressed between bottom end plate 16 of the filter cartridge 5 and the bottom end of the canister 4 of the filter element 3. A seal between the hollow cylindrical core 19 and annular space 14 is provided at the head end of filter cartridge 5 by a flange on annular end seal 17 which extends away from attachment plate 11 and slidably and sealingly engages the exterior surface of filter cartridge 5. Annular end seal 17 may be fabricated of any suitable material, for example, sheet metal, and is fixed to attachment plate 11 by any suitable means, for example, welding, brazing, or application of adhesive. The cylindrical filter element cartridge 5 has a hollow cylindrical core 19 and may comprise, for example, a pleated fiber filter 6 contained within a perforated metal shell 7 which is surrounded by an exterior collection batting 8 of, for example, nonwoven polyester.

The attachment nipple 13 has a central inlet passage 20 and a collar 21 about its exterior which separates a threaded head end and a threaded bottom end of the nipple. In the exemplary embodiment shown, the attachment nipple 13 is threaded into the head 2 during the manufacturing process and the raised collar 21 is drawn down tightly upon the surface of attachment plate 12 so that the filter element 3 may later be attached to the head 2 by engaging the bottom threads of the attachment nipple with threads provided in an orifice in the center of the attachment plate 11. In the exemplary embodiment, attachment plate 11 is joined at its periphery to the filter element canister 3. Alternatively, attachment plate 11 might be releasably joined to the filter canister 3 to allow replacement of filter cartridge 5. When the filter unit 1 is assembled, the edge at the head end of the canister 3 is drawn into sealing engagement with the mounting surface 12 by the engagement of threads in the central orifice of the attachment plate 11 with those of the attachment nipple 20. A seal between the canister 3 and mounting surface 12 is assured by the presence of a mounting surface seal.

In the exemplary preferred embodiment, a siphon tube 22 extends along the center line of the canister 4 and filter cartridge 5 from the bottom portion of the canister 4, through an annular seal 23 in bottom end plate 16 of the cartridge 5, through the central inlet passage 20 of the attachment nipple 13, and into a receiver fitting 24 in the head 2 which is in fluid communication with return passage 25. In the exemplary embodiment, receiver fitting 24 has a bore with a chamfered edge 30 which provides a sliding fit with the head end of tube 22. Return passage 25 of the exemplary embodiment includes flow rate control orifice 26 at the base of the bore of the receiver fitting 24. A head end locating bracket 27 is provided in the filter canister 4 of the exemplary filter unit 1 to provide positive location of siphon tube 22 when the unit 1 is assembled or when the filter element 3 is not attached to the filter unit head 2.

Siphon tube 22 may be made of any suitable metallic or nonmetallic material. In the exemplary embodiment, the bottom end of siphon tube 22, adjacent the bottom end of canister 4, is cut at an angle to the tube axis to assure it does not become blocked against the canister. Cartridge end plate 16 and seal 23 may be made of any suitable materials, for example, sheet metal and a resilient elastomer, respectively. Further, seal 23 may be eliminated and any space between the siphon tube 22 and end plate 16 alternatively closed by, for example, welding, brazing, or application of adhesive. The locating bracket 27 may be formed of, for example, sheet metal with a central hole through which siphon tube 22 may pass. Siphon tube 22 may be attached to the locating bracket 27 by brazing, welding, application of adhesive, or other means, or, as in the exemplary embodiment, simply slidingly restrained by the bracket. The receiver fitting 24, return passage 25, and orifice 26 may be formed as an integral part of the head 2 during its manufacture by, for example, casting and machining operations. Alternatively, they may be formed within or by assembly of additional elements combined with a basic head unit.

The exemplary coalescer filter unit 1 is installed in a gas circulation system by connection of an inlet (not shown) to high pressure inlet chamber 9 of the head 2 and an outlet (not shown) from lower pressure outlet chamber 10 of the head 2. When in operation, gas enters the inlet chamber 9 and flows through the central passage 20 of the attachment nipple 13 into the central core 19 of the filter cartridge. The gas then flows from the central core 19 radially outward through the filter cartridge wall into the annular space 14 and thence to the low pressure outlet chamber 10 by way of vents 28 in attachment plate 11 and outlet passages 29 in head 2, which provide fluid communication between annular space 14 and outlet chamber 10.

As oil laden gas flows from the central core 19 of the filter cartridge through the filter layers of the cartridge wall, the oil first coalesces in the pleated fiber filter 6 and then migrates outwardly, under the influence of the outward radial pressure gradient, through the perforated metal shell 7 to form droplets on the exterior surface of the collection batting 8. The coalesced drops of oil then flow downward, away from the head and towards the bottom of the filter canister 4, under the influence of gravity and form a pool at the base of canister 4. A low pressure is maintained through the siphon tube 22 by a connection (not shown) between the oil return passage 25 and a low pressure point in the gas circulation system, for example, at the inlet end of the system compressor. The pooled oil in the bottom of canister 4 is drawn upward through the siphon tube 22, through the return passage 25, and on to the low pressure point in the system. The flow rate at which oil and incidental gas flow through the tube 22 is controlled by sizing of the orifice 26. The maximum depth to which the oil pool is allowed to form is controlled by adjusting the fit and length of engagement of the siphon tube 22 in the receiver fitting 24.

In the exemplary embodiment of the coalescer filter unit 1, when the filter element 3 is removed from the head 2, the friction between the annular seal 23 in the cartridge end plate 16 and siphon tube 22 is sufficient to retain the siphon tube in the filter element 3. Retention of the siphon tube in filter element 3 could also be accomplished, for example, by brazing or welding the siphon tube 22 to the end plate 16 or to the locating bracket 27. When the filter element 3 is assembled with the head 2 of the exemplary filter unit 1 the head end of the siphon tube 22 first enters the receiver fitting 24 prior to the engagement of the bottom threads of attachment nipple 13 by the internal threads of the orifice in base plate 11 to ensure proper connection between the siphon tube 22 and the return passage 25. The chamfered edge 30 provided on the bore of the receiver fitting 24 facilitates proper location of the siphon tube end. Alternatively, the siphon tube 22 could be manufactured to slide freely in the locating bracket 27 and end plate 16 so that it could first be set in receiver fitting 24 and then filter element 3 aligned with and fitted over the siphon tube 22.

While an exemplary coalescer filter unit embodying the invention has been described, it will be understood, of course, that the invention is not limited to this embodiment. Modification may be made by those skilled in the art, particularly in light of the foregoing teaching. For example, the flow control orifice in the return passage could be replaced or supplemented by a variable throttling valve in the return passage or a valve could be provided in the return passage which opened only periodically in response to a timing device or oil pool depth sensing device. It is, therefore, contemplated by the appended claims to cover any such modification which incorporates the essential features of this invention or encompasses the true spirit and scope of the invention.

We claim:

1. In a spin-on type coalescer filter unit having a spin-on filter element including a canister with a head end and a bottom end and a filter cartridge within the canister, a head with a mounting surface, an attachment means for attaching the filter element to the mounting surface, an inlet passage for allowing fluid to flow into filter element and an outlet passage for allowing fluid to flow from the filter element, a drain device comprising:

a tube means with a bottom end and a head end and a tube passage means for conducting fluid flow from an opening at said tube means bottom end to said tube means head end, said tube means bottom end located within said canister at its bottom end and said tube means head end located proximate to the head end of the canister, a receiver fitting in said head including a receiving means for receiving said tube means head end and a return passage means for conducting fluid flow from said head end of said tube means out of the filter unit, so that fluid may flow from the bottom end of said canister through said tube passage means and return passage means and out of said filter unit under the influence of elevated pressure within the canister.

* * * * *